UNITED STATES PATENT OFFICE.

DORRIS WHIPPLE, OF NEW YORK, N. Y., ASSIGNOR TO STANDARD CHEMICAL COMPANY, OF BAYONNE, NEW JERSEY, A CORPORATION OF NEW JERSEY.

RESINOUS COMPOUND.

1,083,170.  Specification of Letters Patent.  Patented Dec. 30, 1913.

No Drawing. Application filed November 6, 1909. Serial No. 526,666.

*To all whom it may concern:*

Be it known that I, DORRIS WHIPPLE, citizen of the United States, residing at New York, in the county of New York and State of New York, have invented new and useful Improvements in Resinous Compounds, of which the following is a specification.

In companion applications, Serial Numbers 526,660, 526,661, 526,663 and 526,664, filed of even date herewith, are described a new resinous compound in the form of soft, non-oxidizing, non-drying, permanently plastic mass of very high electrical resistivity, and a new resinous derivative in the form of a limpid, oxygenated oil, which is permanently fluid, incapable of further oxidization, and possesses a high electric resistance factor. Each of said products is admirably adapted as an insulating medium for electrical cables and the like, and it is found that a combination of the two new products, which for convenience is designated insuline resin, and insuline oil, respectively, is especially well adapted as an insulating medium in cases where the high fluidity of the oil alone on one hand, and the gummy character of the resin on the other would render the application of the products individually unsatisfactory.

The present invention therefore contemplates the provision of an insulating compound including both insuline resin and insuline oil with or without additional ingredients.

To produce the insuline resin, any resin which consists essentially of abietic anhydrid or abietic acid, preferably rosin, is heated in an iron still to a temperature of approximately 135° C., and the molten mass blown with moist air for the purpose of oxidizing the abietic acid until the contents of the still show a high percentage of tetraabietic acid. After the foregoing operation has been conducted for the necessary period of time, determined by the specific tests described in my applications aforesaid, the temperature of the mass in the still is raised to approximately 140° C., and dry air is passed through the mass for the purpose of expelling any uncombined watery vapor resulting from the previous operation and to effect a further oxidization of the abietic acid. After the conclusion of this operation the resultant product is my improved insuline resin, which is in the form of a soft, gummy material, having a specific gravity of .98, which melts at a temperature about 20° C., lower than the melting point of the rosin from which it was made, which is less soluble in petroleum spirits than rosin and is freely soluble in petroleum oils, is non-drying, is incapable of further oxidization, and retains its soft and plastic condition indefinitely; is free from carbonaceous particles and contains no rosin oil, no pinene derivatives, and no volatile organic acids.

To produce insuline oil, rosin in appropriate quantities is heated in an iron still to a temperature of 150° to 200° C., and until the distillate begins to show the presence of resin or resin hydrocarbons. The temperature is then raised to substantially 250° C., and air which has been saturated with watery vapor at approximately 100° C., is passed through the heated mass in the still to drive off any remaining volatile constituents and to furnish the necessary oxygen or hydroxyl groups to the resin. The cover of the still is then tightly fitted and the temperature raised to approximately 360° C. to break up the oxygenated resin into lower homologues which constitute oxygenated resin oil. The distillate from this operation is again introduced into the still and blown with dry air at a temperature of approximately 150° C., to drive off the turpentine products resulting from the next preceding operation, which effect is indicated by the absence of turpentine oils or vapors in the distillate. The residual oil is now subjected to a temperature of approximately 320° C., and the first portion of the distillate is rejected, while the remaining portion is collected and the distillation carried on until the carbonization point is reached. This final distillate is the new insuline oil, which is found to be an oxygenated resin oil, to wit: a saturated oil having all its bonds satisfied or saturated with hydroxyl or oxygen, which is incapable of further oxidization under any conditions of heat, light, and moisture that are encountered when the material is applied to the purposes for which it is intended, is non-drying, limpid and slightly fluorescent in appearance: cannot be saponified, is miscible with petroleum oils, and possesses an electrical resistance capacity at least twice as great as the best resin oil or vegetable oils.

By mixing regulable portions of insuline resin and insuline oil hereinbefore described, an insulating compound of any desired degree of plasticity or fluidity may be produced without materially effecting the high insulating capacity of either of the constituents. For example, should it be found desirable to produce an insulating medium to saturate the paper sheathing for an electrical cable, the oil and the resin would be mixed in such proportions that the resultant compound would flow freely enough to thoroughly impregnate the paper. On the other hand should the compound be intended for use in connection with a textile or fibrous wrapping or sheathing of the cable, it is obvious that the compound should preferably possess somewhat high viscosity, and to effect this result a larger proportion of the resin would be employed. In any event the oil and resin may be freely combined in proportions best suited to the particular conditions under which the insulating material is to be applied and employed.

While the compound consisting of the insuline oil and insuline resin, hereinbefore described, is in itself admirably adapted to most purposes in the electrical arts, it will be understood that the compound aforesaid may be used with any of the well known insulating media, such for example, as rosin, rosin oil, paraffin, and paraffin oils.

The compound alone or in admixture with other insulating media may be applied to the insulating sheath of cables and the like by any improved method, either as a mass filling between the exterior sheath and the cable proper, or as an impregnating medium for the windings or wrappings for the cable.

What I claim is:

An insulating compound comprising a resin derivative in the form of a soft, non-drying, non-oxidizing permanently plastic mass, and a resin oil in the form of a non-oxidizing, non-drying, non-saponifiable resin derivative.

In testimony whereof I have hereunto set my hand in presence of two subscribing witnesses.

DORRIS WHIPPLE.

Witnesses:
MERLE I. ST. JOHN,
HARRIETT E. REESE.